(No Model.)
2 Sheets—Sheet 1.
H. ECKHARDT.
SLIDE REST FOR LATHES.
No. 516,678. Patented Mar. 20, 1894.
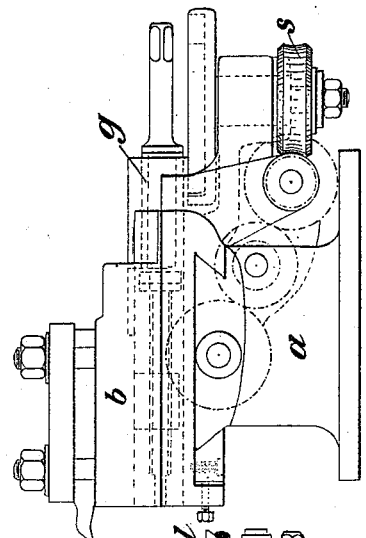
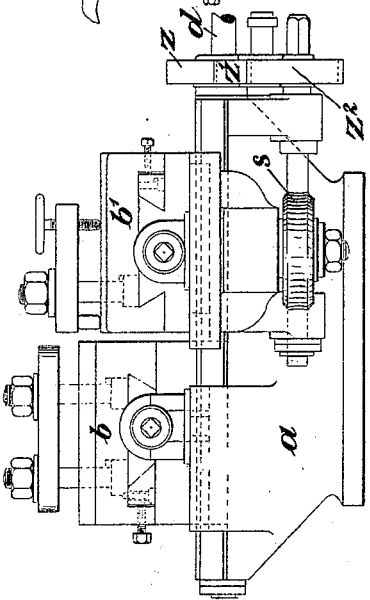
Attest:
Walter E. Allen.
W. P. Keene.
Inventor:
Heinrich Eckhardt.
By Knight & Bros
Attorneys.

(No Model.)
H. ECKHARDT.
SLIDE REST FOR LATHES.
No. 516,678. Patented Mar. 20, 1894.
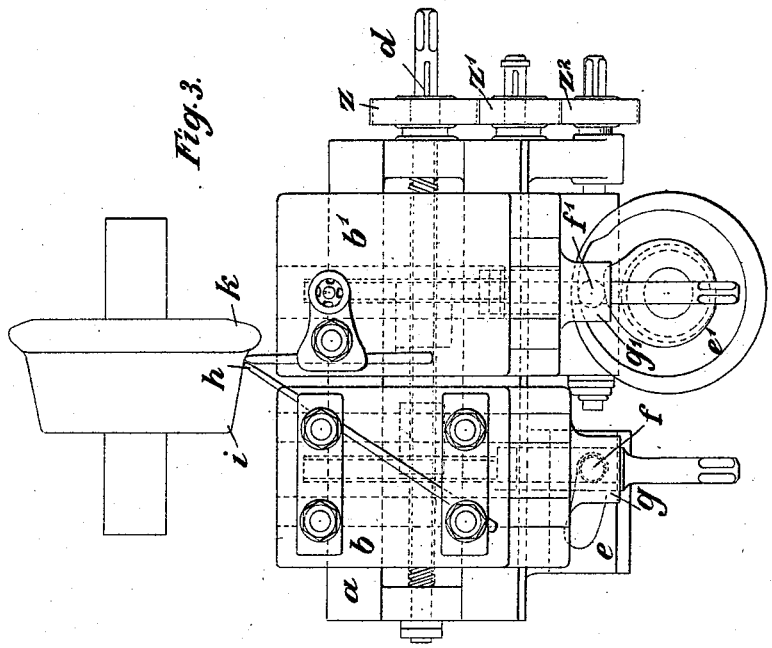

UNITED STATES PATENT OFFICE.

HEINRICH ECKHARDT, OF DORTMUND, GERMANY.

SLIDE-REST FOR LATHES.

SPECIFICATION forming part of Letters Patent No. 516,678, dated March 20, 1894.

Application filed May 11, 1892. Serial No. 432,582. (No model.) Patented in Belgium October 15, 1890, No. 92,080; in Austria-Hungary January 7, 1891, No. 41,553 and No. 72,354, and in France January 12, 1891, No. 208,413.

*To all whom it may concern:*

Be it known that I, HEINRICH ECKHARDT, a subject of the Emperor of Germany, residing at Dortmund, in the Empire of Germany, have invented new and useful Improvements in Slide-Rests for Lathes, Planing-Machines, and the Like, (for which I have received patents in Austria, No. 41,553, dated January 7, 1891; in Hungary, No. 72,354, dated January 7, 1891; in France, No. 208,413, dated January 12, 1891, and in Belgium, No. 92,080, dated October 15, 1890,) of which the following is a description, reference being had therein to the accompanying drawings.

This invention for improvements in tool rests for lathes, planing machines, and the like, has for its object to mechanically guide the cutting tool or tools, as it is fed by hand, or otherwise, so as to cut the article being worked to the desired shape, as it is rotated or reciprocated past the cutting edge.

In the accompanying sheets of drawings: Figure 1 is an end elevation of a slide rest, suitable for turning flanged tires for railway vehicles, constructed according to this invention. Fig. 2 is a side elevation, and Fig. 3 is a plan of the same.

The top slides or tool seats $b, b'$, are mounted on cross slides, said slides being mounted on the base $a$. The cross slides, slide transversely either toward or from each other, by means of the right and left handed screw $d$, the pitches of the two parts of the screw being dependent upon the work to be done by the tool carried by the corresponding top slides. The tool on the top slide $b$ is arranged to cut the part $i$ to $h$ of the wheel, while the tool on the top slide $b'$ cuts the part $k$ to $h$. The tool is forced to follow the line, $i\,h$ as the screw $d$ moves the slide or tool seat $b$ and its slide the pin $f$ moves in the curved race $e$ sliding the slide $b$ away from the axis of rotation. This race or slot $e$ is formed in an extension of the main frame $a$ and the pin $f$ is adjustable on the extension $g$ of the slide $b$. By curving the slot $e$, a slight curvature is given to the surface $i\,h$. The tool seat $b'$ having to slide so as to cut the portion $h\,k$ receives its motion from the race $e'$. This race $e'$ is cut in a revolving disk and is curved as shown, a pin $f'$ on the slide $b'$ traveling in this race imparts a curved movement to the tool-seat $b$ on its slide. This pin $f'$ is fastened in the bearing $g'$ of the slide. By the above means it is possible for each slide and consequently each tool to move in a direction independent of that of the other slide or tool, thus materially shortening the time necessary to turn objects of a certain determined form.

Having thus described my invention, what I claim, and desire to secure by Letters Patent of the United States, is—

1. In a tool rest slide, the combination of the main frame, two or more slides mounted and adapted to slide thereon, a screw for moving the slides to and from each other and connections from said screw to the cam for moving the slide transversely to the screw, substantially as described.

2. In a tool rest slide, the combination of a main frame, slides mounted and adapted to slide thereon, seats for the cutting tools adapted to slide on the slides, means for moving the slides to and from each other and cams to slide the tool seats independently of each other, substantially as described.

In witness whereof I have hereunto set my hand in presence of two witnesses.

H. ECKHARDT.

Witnesses:
RUDOLPH FRICKE,
WILHELM ESSENWEIN.